United States Patent [19]

Bobeck et al.

[11] 3,723,716

[45] Mar. 27, 1973

[54] SINGLE WALL DOMAIN ARRANGEMENT INCLUDING FINE-GRAINED, FIELD ACCESS PATTERN

[75] Inventors: Andrew Henry Bobeck, Chatham; Henry Evelyn Derrick Scovil, Gladstone, both of N.J.

[73] Assignee: Bell Telephone Laboratories, Incorporated, Murray Hill, N.J.

[22] Filed: July 8, 1971

[21] Appl. No.: 160,841

[52] U.S. Cl. ..............................235/176, 340/174 TF

[51] Int. Cl. ........G06f 7/50, F11c 11/14, G11c 19/00

[58] Field of Search ..................235/176; 340/174 TF

[56] References Cited

UNITED STATES PATENTS 3,541,534 11/1970 Bobeck et al. ..................340/174 TF 3,540,021 11/1970 Bobeck et al. ..................340/174 TF 3,534,346 10/1970 Bobeck ...........................340/174 TF 3,540,019 11/1970 Bobeck ...........................340/174 TF

OTHER PUBLICATIONS

Y. S. Lin, "T-Bar Array for Bubble Domain Devices" IBM Tech. Disclosure Bulletin Vol. 13 No. 9, Feb. 71 p. 2625

*Primary Examiner*—Malcolm A. Morrison
*Assistant Examiner*—David H. Malzahn
*Attorney*—R. J. Guenther et al.

[57] ABSTRACT

A single wall domain propagation arrangement is provided by a pattern of closely spaced magnetically soft elements which define a "fine-grained" propagation path between a plurality of inputs and outputs. The pattern permits movement of domains laterally across the path, an option exercised by the design of the pattern itself or by domain interaction. When lateral movement is employed, the output at which a domain occurs is a logical function of the input and a full adder operation may be realized.

20 Claims, 9 Drawing Figures

INVENTORS A.H. BOBECK
H.E.D. SCOVIL
BY Herbert M. Shapiro
ATTORNEY

SINGLE WALL DOMAIN ARRANGEMENT INCLUDING FINE-GRAINED, FIELD ACCESS PATTERN

FIELD OF THE INVENTION

This invention relates to data processing arrangements and more particularly to such arrangements in which information is represented as single wall domains.

BACKGROUND OF THE INVENTION

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain as is well known.

One propagation arrangement comprises a pattern of electrical conductors each designed to form conductor loops which generate the requisite fields when externally pulsed. The loops are interconnected and pulsed in a three-phase manner to produce shift register operation as disclosed in A. H. Bobeck, U. F. Gianola, R. C. Sherwood, W. Shockley U.S. Pat. No. 3,460,116 issued Aug. 5, 1969.

An alternative propagation arrangement employs a pattern of magnetically soft elements adjacent the surface of a layer in which single wall domains are moved (or a pattern of grooves in the surface). In response to a magnetic field reorienting in the plane of the layer, changing pole patterns are generated in the elements. The elements are arranged to displace domains along a selected path in the layer as the in-plane field reorients. The familiar T- (or Y-) bar overlay arrangement responds to a rotating in-plane field to so displace domains. Arrangements of this type are called "field access" arrangements and are disclosed in A. H. Bobeck U.S. Pat. No. 3,534,347 issued Oct. 13, 1970. Regardless of the mode of propagation, localized magnetic field gradients cause domain movement. In the field access mode, those gradients are caused by the accumulation of attracting and repelling poles in the overlay elements due to the in-plane field.

Typically, the field access mode requires a pattern of elements for moving domains simultaneously along parallel channels where the movement of domains from one channel to another is not permitted by the design of the pattern.

BRIEF DESCRIPTION OF THE INVENTION

The present invention employs a pattern of closely spaced overlay elements for defining a plurality of parallel channels in a layer of material in which single wall domains can be moved. In this instance, however, movement from one channel to another is permitted by spacing the elements, laterally with respect to the direction of domain movement, distances small compared to the size of a domain. The lateral displacement of a domain is determined by the configurations of domains introduced into the channels at a given time and/or by variations in the geometry of the elements. In one specific embodiment, the overlay pattern defines first, second, and third paths having first, second, and third inputs and outputs. The overlay pattern is designed so that a domain introduced at any input generates an output signal at the second output. On the other hand, domains introduced simultaneously at any two inputs provide output signals at the first and third outputs. Domains introduced at all three inputs provide output signals at all three outputs. A full adder circuit results.

DETAILED DESCRIPTION

Figure 1:
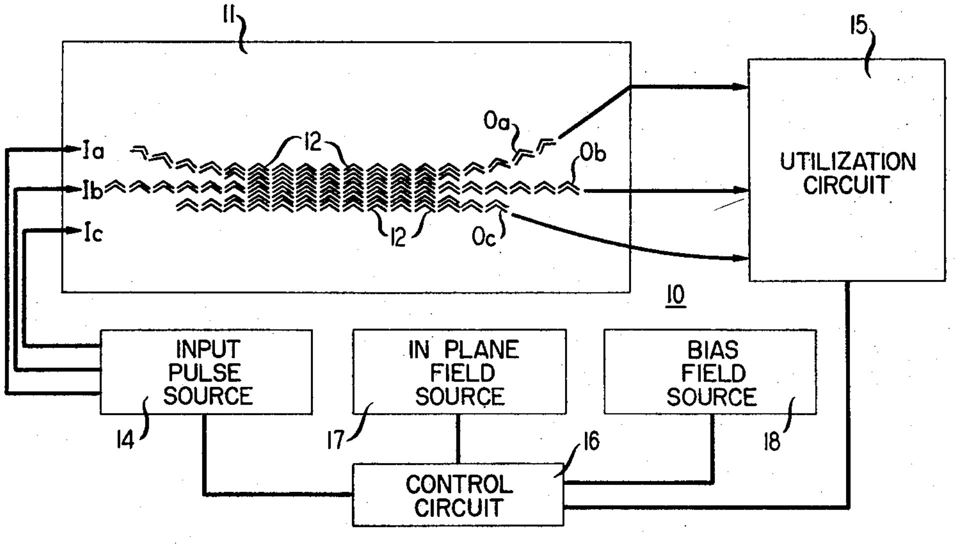
FIG. 1 is a schematic illustration of a single wall domain logic arrangement in accordance with this invention.

FIG. 1 shows a single wall domain arrangement 10 in accordance with this invention. The arrangement comprises a layer 11 of material in which single wall domains can be moved. A (fine-grained) pattern of magnetically soft elements 12 define a plurality of channels for single wall domains illustratively between three input channels I*a*, I*b*, and I*c* and three output channels O*a*, O*b*, and O*c*.

Input and detection implementations for providing and detecting single wall domains are well known in the art and an explanation thereof is unnecessary to an understanding of this invention. Accordingly, each input channel is assumed to have associated with it a suitable means for providing domains selectively without detailed discussion thereof. Such a means is represented by arrows directed into the associated channels and originating at a block 14 entitled input pulse source in FIG. 1. Similarly, the output channels have associated arrows directed towards a block 15 designated utilization circuit. Inputs and outputs are synchronized with respect to the phasing of a rotating in-plane field under the control of a control circuit 16 as shown in FIG. 1. The source of a suitable rotating in-plane field is represented by block 17 of FIG. 1. Block 18 of FIG. 1 represents a source of a bias field for maintaining single wall domains at some nominal diameter during operation.

Figure 2:
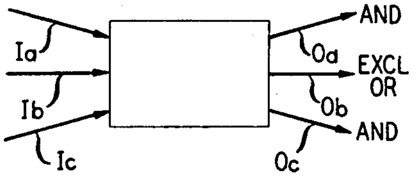
FIG. 2 is a line diagram of the operation of the arrangement of FIG. 1.

Arrangements of the type shown in FIG. 1 are operative as either half or a full adder as diagrammed in FIG. 2. To be specific, it will be shown that the overlay pattern of FIG. 1 is operative in response to a reorienting in-plane field to provide a signal only in output channel Ob whenever an input is provided in any one of the input channels Ia, Ib, or Ic. The arrangement will be seen, further, operative to provide a null in channel Ob and a signal in both of channels Oa and Oc when an input occurs in any two of the input channels. Also inputs in all of the channels Ia, Ib, Ic produce outputs at Oa, Ob, and Oc, respectively.

Operation in the prescribed manner depends on the geometry of the overlay elements in FIG. 1 and a discussion of this geometry is undertaken first to provide a pedestal for the understanding of the full adder operation.

Figures 3A, 3B, 3C:
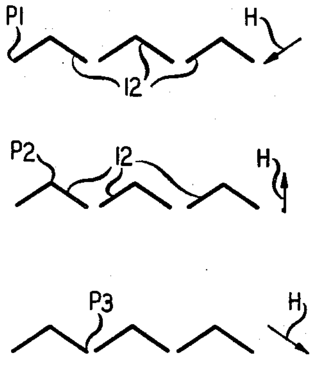
FIGS. 3A, 3B, 3C, 4, 5, and 6 are schematic illustrations of portions of alternative configurations for the arrangement of FIG. 1.

A single horizontal line of V-shaped elements operate to define a domain propagation channel as does any familiar overlay pattern. To be specific, FIG. 3A shows a chevron-shaped pattern of magnetically soft V-shaped elements 12 which function to move domains in layer 11 of FIG. 1 from left to right as viewed in response to a clockwise rotating in-plane field. The field is represented by arrow H in consecutive orientations in FIGS. 3A, 3B, and 3C moving a domain from position P1 to P2 to P3 in the figures. The period of the pattern defines the stages of the channel determining the disposition of a domain pattern representative of information and the movement of the pattern in the channel as the in-plane field rotates. The chevron-shaped pattern can be seen to respond to the rotating in-plane field much as the familiar T-bar overlay pattern.

But the close spacing of elements of adjacent channels provides a significantly increased capability. Although each individual line of elements responds to the in-plane field as do the elements of FIG. 3A a plurality of lines of these elements, in close proximity to one another and having the spacings between the lines small compared to the diameter of a typical single wall domain in layer 11, permits a domain being advanced from left to right as viewed to be displaced laterally to provide a capability hitherto not only unrecognized as useful but thought disruptive of useful operation. Overlay circuits normally are designed to avoid lateral movement from channel (viz: horizontal line of elements) to channel. In the limit where the spacing between adjacent elements useful in accordance with this invention is large compared to the size of a domain (at least three domain diameters), domain movement is confined to a selected line of elements as is the case with familiar overlay patterns. On the other hand, when the spacing is small compared to the size of a domain, a domain "sees" attracting poles as a crest of a wave across several lines of elements as represented by the positive signs in FIG. 4. A domain DO having a diameter large compared with the spacings between channels tends to expand, because of the poles, into a strip for movement. Whether the domain actually becomes a strip or remains a domain depends on the relative values of the bias field tending to retain the domain at a constant size and the drive field which determines the pole strength.

Consider the case where the bias field is of sufficient magnitude to retain a domain diameter at a nominal value. As the in-plane field rotates, the domain advances from left to right as shown in FIGS. 3A, 3B, and 3C following the attracting poles from position to position. But in each position, the domain is on the crest of a wave of attracting poles which extends laterally with respect to its normal direction of movement. The domain, of course, can be displaced laterally along the crest, given some mechanism to so displace it, and that lateral displacement is entirely consistent with the normal motion of the domain.

There are a variety of arrangements for providing a force for the lateral displacement of a domain. One arrangement is to reduce the spacing between adjacent lines of elements in the center of the overlay pattern along a median line designated M in FIG. 4. The smaller the spacings, the greater the pole strength. An overlay arrangement, thus, with a plurality of horizontal lines of V-shaped elements with different graded spacings causes domains to drift to the channel (or channels) which provides higher pole strength. Of course, relatively high pole strength may be provided along selected ones of many propagation channels.

Figure 5:

Varying the spacing between parallel lines of elements is not the only mechanism for achieving lateral drift. For example, FIG. 5 shows an arrangement where the spacings between overlay elements to the left at each stage is greater than to the right at each stage as viewed. Domain motion may be directed along prescribed paths also by "concentrating" the elements in this manner building into the paths a lateral drift toward the center of the pattern in a direction transverse to the domain motion. Relatively high pole concentration can be achieved also by increases in the width or thickness of the elements where desired.

An illustrative domain propagation arrangement of the type described with a preferred path toward which domains drift because of the relatively high pole strength has been found to be particularly useful. Let us return for the moment to FIG. 1. Consider the case where the spacings between adjacent chevrons is relatively small along the axis between input Ib and output Ob and that the pattern defines three channels Ia–Oa, Ib–Oand Ic–Oc, each comprising several horizontal lines of elements. Any domain introduced at Ia, Ib, or Ic, consequently drifts to the axis, along which the pole strength is the highest, desiring movement from left to right in response to the rotating in-plane field and thus provides an output at Ob. It is clear then that an output occurs at Ob for a domain introduced at any one of the input channels.

Figure 4:
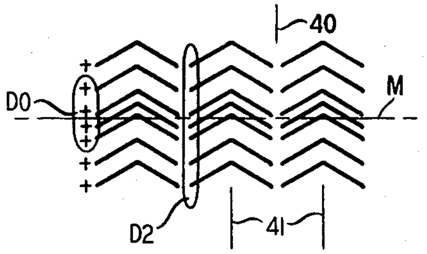

On the other hand, lateral drift does not occur if domains are introduced on any two of channels Ia, Ib or Ic because the drift force is adjusted to be overcome by the repulsion forces between such domains. The domains instead advance to the right stage by stage in response to the consecutive rotations of the in-plane field to provide outputs at both Oa and Oc. It is important to note that such outputs occur when domains are introduced in any pair of input channels Ia, Ib, and Ic and, consequently, represent the logical AND function. It is equally important to recognize that a null occurs in output channel Ob under these circumstances and that the null represents the exclusive OR function. If we also recognize that an AND output represents the "carry," we can see that the exclusive OR plus an AND function provide a half-adder operation where output channel Oc may be connected to input channel Ib or to an input Ib of a next consecutive stage to provide a serial full adder capability. The circuit of FIG. 1 with modified spacings as shown in FIG. 4 can be seen to be operative as a full adder circuit if we recognize the inputs as $Ia$ = Carry, $Ib$ = first number, $Ic$ = second number and the outputs are $Oa$=$Oc$= carry, $Ob$ = sum.

Figure 6:
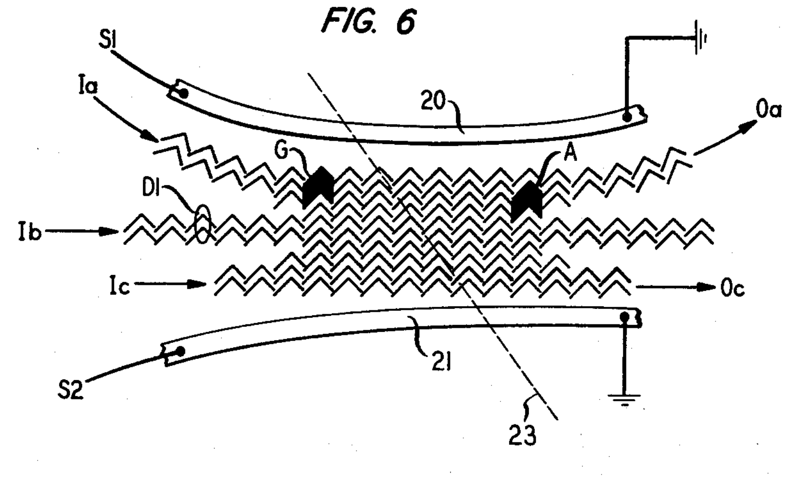

A domain propagation overlay geometry permissive of lateral drift and designed to produce a prescribed lateral drift is seen to lead to quite useful arrangements. But lateral drift need not be a consequence of the overlay design arrangement itself. For example, FIG. 6 shows an overlay arrangement where the spacings between elements is constant and the pole strength as a result is everywhere the same. Domain movement from left to right as viewed in response to a rotating in-plane field occurs in this instance without lateral displacement in the absence of an externally generated displacement field.

Such an external field may be provided by, for example, currents applied to electrical conductors 20 and 21 of FIG. 6. A difference in the levels of current flow in conductors 20 and 21 generates a field gradient which displaces laterally a domain D1 introduced at $Ib$ and moving to $Ob$ in response to a rotating in-plane field. Depending on the polarity of the currents applied, domain D1 is displaced upward or downward to provide an output at $Oa$ or $Oc$. The circuit may be seen to be quite useful for the scanning of lines as is necessary in telephone line scanning circuits in response to service requests in response to off-hook signals in telephone auxiliary lines. Particularly in this application, the bounds of the overlay arrangement constrain a domain from displacement out from under the overlay pattern. This constraint is due to the fact that a domain finds flux closure through the magnetically soft overlay and a considerable increase in field is necessary to move a domain away from a position where such flux closure occurs. Accordingly, small differences in currents flowing in conductors 20 and 21 cause domain drift but excessive differences in those currents do not cause unusable drift and an output still occurs at $Oa$ or $Oc$—*a* property particularly useful in line scanning where current surges do occur on the lines.

A similar deflection of a domain is achieved by a single conductor aligned along broken line 23 in FIG. 6. A current pulse on this conductor is useful to deflect downward domains introduced at $Ia$ for detection at $Oc$.

Overlay arrangements having geometries to permit lateral displacement have been found to have particularly attractive operating margins. The attractive margins are attributed to the fact that the circuit is capable of moving domains which have a relatively wide range of diameters. In a typical material, a domain is stable over a range of diameters from that below which spontaneous collapse occurs to that above which the domain strips out uncontrollably. Usually the collapse and strip out diameters differ by a factor of three. A variation of bias field over less than about a 20-oersted range corresponds to the permissible range in domain diameter and an operational diameter for domains is selected by the bias field value. In a typical overlay, the period of the overlay pattern is three domain diameters and the spacings between adjacent channels is about the same in order to avoid domain interactions. This relationship determines the size of the overlay elements and the spacings between those elements. Should a domain size vary, for example, due to a material nonuniformity, or should the geometry of the overlay vary, for example, due to a turn in the channel, operating margins are decreased, as is well understood in the art, from the maximum defined by the limits to the bias field.

But the arrangements in accordance with this invention propagates strip domains as represented by domain D2 of FIG. 4 as well as circular domains. Consequently, the range of bias values over which propagation occurs is relatively large and the operating margins are enhanced accordingly. The range of bias field values for a given layer of domain material typically about doubles from say 15 to 18 oersteds to 33 to 40 oersteds when a fine-grained pattern of elements in accordance with this invention is employed.

Improved margins may be seen to result directly from the fine-grained pattern of elements because the pattern provides increased pole strength in response to a given drive field due to the reduced flux closure path lengths implicit in such a structure and to the increased amount of material in the elements coupled to the inplane field at any given orientation. Moreover, domains of different sizes may be propagated along a fine-grained pattern because of waves of like poles oriented perpendicular to the direction of movement of domains. Consequently, drive requirements are reduced and bias margins are increased leading to an arrangement which is relatively insensitive to temperature excursions as well as circuit (viz: missing elements or portions thereof) or material defects even if the layer in which domains move is itself temperature sensitive.

The spacing between elements has been described as small compared to the size of a domain. Actually, the spacing is usually smaller but may be larger than the diameter of a domain. It is necessary only that the movement of a domain be determined by the poles of at least two and preferably at least three elements (V-shaped) closely spaced laterally with respect to the direction of movement.

The repeat or period of the illustrative chevron overlay pattern is clearly defined in FIG. 1, for example, by the separation between V-shaped elements into aligned groups corresponding to the stages of the channel. But such alignment is not necessary. FIG. 6 illustrates the elements of adjacent groups overlapping one another. In arrangements of the type where elements of consecutive groups overlap, domain movement during each cycle of the in-plane field appears more uniform and drive fields even lower than nonoverlapping patterns produce domain movement.

As has been mentioned above, relatively high operating speeds are achievable with closely spaced elements in accordance with this invention. The reason for this is clear when it is realized that such an arrangement of elements increases the coupling between the drive field and a domain. A comparison, for example, between the chevron overlay and a T-bar overlay pattern underscores the increased coupling in terms of the area of a propagation channel for movement of a domain of a given size. When such a channel is defined by a T-bar pattern, the pattern occupies about 20 percent of the area of a suitable channel. When a like propagation channel is defined by the chevron pattern, the pattern occupies at least about 40 percent of the area and as much as 90 percent, the coupling of the drive field to the domain being proportional to the number of chevrons per channel. Of course, when separate channels are defined by patterns in accordance with this invention as shown, for example, to the left and to the right as viewed in FIG. 1, the spacings between channels are about three domain diameters (center-to-center) as is the case with T-bar structure. Such spacings, if present, are not included in these percentages.

The line of strong poles mentioned above, as provided by a fine-grained pattern in accordance with this invention is conveniently used for separating domains from a domain generator. Such a generator may comprise a familiar magnetically soft disk about the periphery of which a domain moves constantly in response to the field variations. But the disk in this case may actually be imbedded in or integrated into the chevron pattern. The generator results in a new domain for each cycle of the in-plane field separated from the generator by the strong line of poles when generated in each cycle. The arrangement may serve as, for example, one of the inputs of FIG. 1.

Similarly, a domain annihilator may be integrated into the fine-grained pattern serving for example, at output *Oa* in FIG. 6. A scanner of the type shown in FIG. 6, accordingly, would operate by continually generating domains at a generator at I*a* for annihilation at O*a* unless deflected to O*c*. Typical generator and annihilator arrangements of this type are shown at G and A in FIG. 6.

Figure 7:
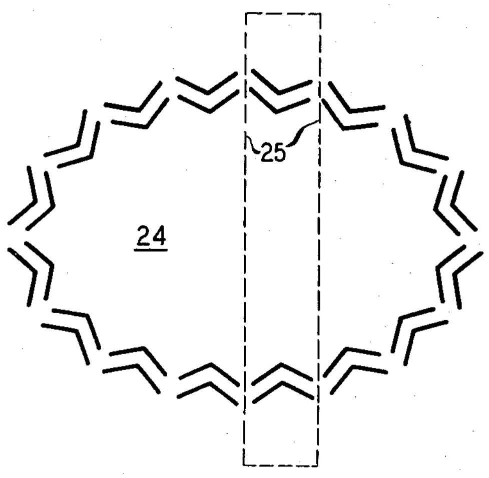
FIG. 7 is a schematic illustration of a domain recirculating loop in accordance with this invention.

As is the case with T-bar overlay arrangement, it is convenient to form closed loop paths for recirculating domains. When such a loop is defined by a chevron pattern, one leg of a recirculating path is an upside-down image of the other leg and the two legs are joined by turns. FIG. 7 shows such a loop arrangement 24 where information circulates clockwise in response to a counterclockwise rotating in-plane field including a suitable turn pattern. Attention is directed to that portion of the chevron pattern encompassed by broken block 25 in the figure. The encompassed elements represent the corresponding stages of the top and bottom legs of the loop as shown. In practice the distance between these stages may be quite close with the tips of the chevrons almost touching. Yet domains will not short-circuit the loop because a domain moving along one leg of the loop into a position at the tip of a chevron sees opposite (repelling) poles at the tip of the associated chevron of the other leg of the loop.

The foregoing discussion is primarily in terms of the movement of "circular" domains rather than strips. But strip domains do move much as described above in response to variations in the in-plane field. It may be appreciated from a glance at FIG. 1 that the movement of a strip domain, which extends laterally across the entire chevron pattern, is attended by the strip being offset alternately upward and downward (as viewed) as it moves left to right because of the nature of the chevron pattern and the offset line of poles generated thereby. Additional magnetically soft elements 40 and 41 of FIG. 4 are positioned to fill in poles to eliminate such an offset. The result is a relatively uniform movement of strips with an attending enhancement of speed of operation.

In one embodiment of this invention domains having nominal diameters of 8 microns were moved in a layer of $Er_2Eu_1Ga_{0.7}Fe_{4.3}O_{12}$ garnet 6 microns thick in response to a rotating in-plane field of 30 oersteds. A bias field of 40 oersteds maintained domain diameters at the prescribed value. A chevron pattern of 12 permalloy (80 Ni20Fe) elements per stage was deposited by photo resist techniques onto a spacing layer on the surface of the garnet. Each element was 3,000 angstrom units thick and 1.4 microns wide having a coercive force of 0.5 oersted. The elements were spaced apart 5 microns thus providing a fine-grained overlay pattern defining a plurality of channels and permissive of lateral displacement. The spacings between the elements of adjacent channels near the central channel (broken line M) as shown in FIG. 4 were relatively small (2 microns). Domains introduced selectively at inputs I*a* and I*c* produced outputs at O*b* and at O*a* and O*c* as described above. Also, strips having lengths of 50 microns were moved along the channels. For reference, the collapse diameter of a domain in the layer was 6 microns.

What has been described is considered merely illustrative of the principles of this invention. Therefore, various embodiments can be devised by one skilled in the art in accordance with those principles within the spirit and scope of this invention. For example, a fine-grained pattern in accordance with this invention may be designed to conform to a diamond shaped envelope where domains introduced with some small diameter expands into a strip half way through the propagation path for detection and then contracts to its initial diameter all due to the overlay geometry. Such an expansion is possible because the chevron pattern is capable of propagating domains of widely different sizes. In addition, the angle between the two sides of a V-shaped element herein is shown as obtuse. But the angle may, of course, be otherwise. In practice, acute angles may lead to still better operating margins.

What is claimed is:

1. A magnetic domain propagation arrangement comprising a layer of material in which single wall domains can be moved, and a pattern of elements coupled to said layer for defining a plurality of multistage channels for moving domains having a first diameter therealong in response to a varying magnetic field, said elements having geometries and being spaced apart distances sufficiently small to permit lateral displacement therebetween.

2. An arrangement in accordance with claim 1 wherein the ones of said elements which define like stages of said channels provide equally attracting poles for domains moving therealong in response to a reorienting in-plane field and the spacing between said elements is about said first diameter.

3. An arrangement in accordance with claim 2 wherein said elements for defining a plurality of adjacent channels comprise a chevron pattern for each of said stages.

4. An arrangement in accordance with claim 3 wherein said chevron pattern for each of said stages comprises V-shaped elements of a geometry to provide relatively high pole concentrations there for ones of said channels.

5. An arrangement in accordance with claim 3 wherein said chevron pattern for each of said stages comprises V-shaped elements spaced varying distances apart to provide relatively high pole concentrations in the channels where said spacings are small.

6. An arrangement in accordance with claim 5 wherein the elements of the central ones of said channels are spaced more closely together than are the remaining ones of said elements.

7. An arrangement in accordance with claim 6 wherein said channels include first and second input positions and first and second output positions disposed to first and second sides of said central ones of said channels, said arrangement including first and second means for introducing domains to first and second input positions.

8. An arrangement in accordance with claim 7 also including first and second means for detecting domains at said first and second output positions said arrangement also including a third output position coupled to said central ones of said channels and means for detecting domains at said third output position.

9. An arrangement in accordance with claim 8 including means for introducing domains selectively to a central one of said channels.

10. An arrangement in accordance with claim 3 including means for displacing domains laterally with respect to said channels.

11. An arrangement in accordance with claim 10 also including first means for detecting domains laterally displaced to a first side of said central one of said channels.

12. An arrangement in accordance with claim 11 wherein said means for displacing domains comprises a first electrical conductor coupled to said layer and responsive to an external signal for generating a magnetic field for so displacing domains.

13. An arrangement in accordance with claim 12 wherein said means for displacing also comprises a second electrical conductor coupled to said layer in a manner such that external first and second signals applied to said first and second conductors respectively generates in said layer a magnetic field proportioned to the difference between said first and second signals to displace a domain moving along said central one of said channels to said first means for detecting domains.

14. A magnetic domain propagation arrangement comprising a layer of material in which single wall domains can be moved, and a pattern of elements coupled to said layer for defining a multistage channel for moving therealong domains having a first size in response to a magnetic field reorienting in the plane of said layer, the elements for each of said stages being spaced apart distances smaller then about said first size and having geometries to provide like poles along a line transverse to the direction of domain movement.

15. An arrangement in accordance with claim 14 wherein each of said stages is defined by two or more V-shaped elements spaced apart from one another along an axis transverse to said direction of domain movement.

16. An arrangement in accordance with claim 15 wherein said elements comprise magnetically soft material.

17. An arrangement in accordance with claim 16 also including means for maintaining said domains at a nominal diameter.

18. An arrangement in accordance with claim 16 wherein said V-shaped elements are arranged in adjacent groups wherein the elements of adjacent groups overlap one another.

19. A domain propagation arrangement comprising a layer of material in which single wall domains having a collapse diameter can be moved, and a repetitive pattern of elements coupled to said layer for defining a multistage channel for domains therein, each of said stages including a plurality of elements laterally spaced apart distances such that each of said domains is coupled to two or more of said elements.

20. An arrangement in accordance with claim 19 wherein said elements of each of said stages are responsive to a magnetic field reorienting in the plane of said layer to generate like pole patterns for moving said domains, and each of said domains is moved in response to changing pole patterns in two or more of said elements.

* * * * *